Aug. 15, 1961    S. A. MURAWSKI    2,995,856
ARTICULATED ARTIFICIAL CASTING BAIT
Original Filed March 31, 1959
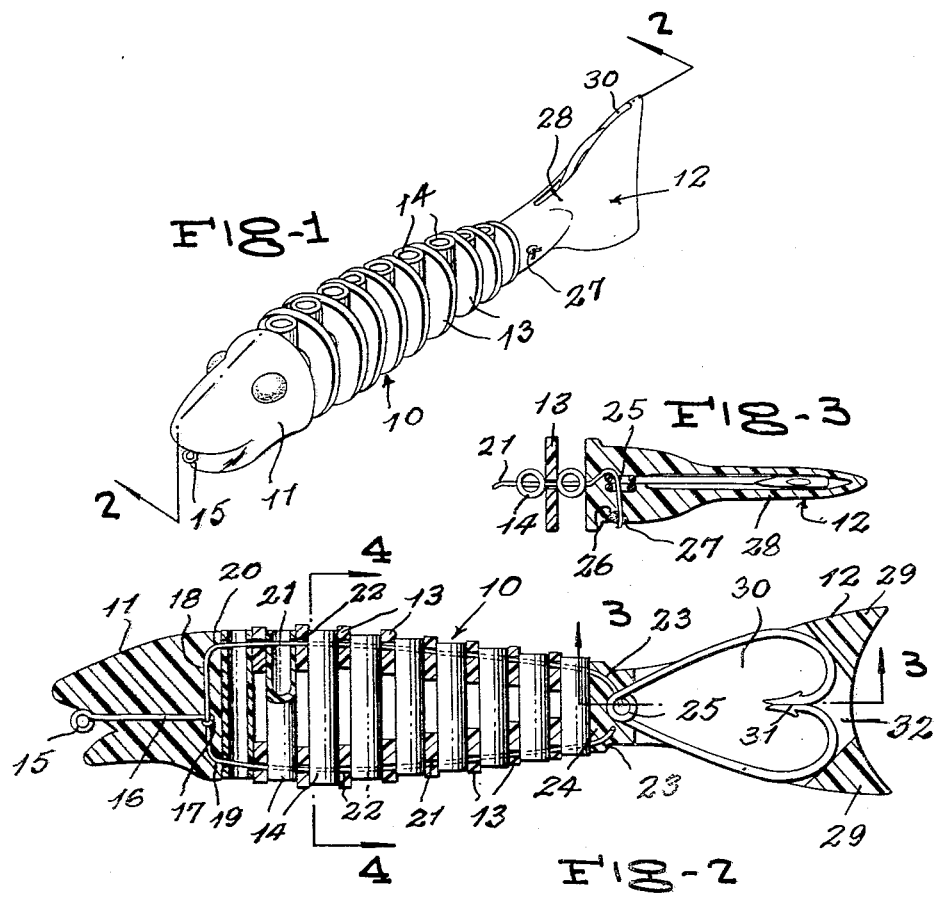
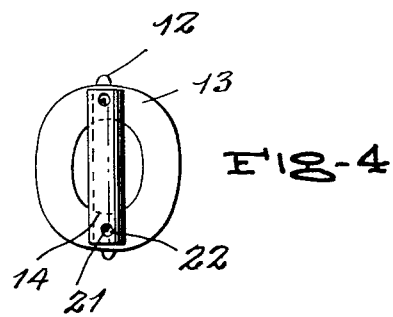
INVENTOR.
STEPHEN A. MURAWSKI
BY
Christian R. Nielsen
ATTORNEY United States Patent Office 2,995,856
Patented Aug. 15, 1961

2,995,856
ARTICULATED ARTIFICIAL CASTING BAIT
Stephen A. Murawski, 13422 Ave. K, Chicago 33, Ill.
Original application Mar. 31, 1959, Ser. No. 803,274, now Patent No. 2,971,285, dated Feb. 14, 1961. Divided and this application Jan. 11, 1961, Ser. 81,984
2 Claims. (Cl. 43—42.06)

This invention relates to an artificial casting bait and it consists in a new and novel assembly of elements in the provision of an articulated bait which will provide motions calculated to lure fish to strike and is a division of my application filed March 31, 1959, Serial Number 803,274, issued February 14, 1961, as Patent No. 2,971,285.

It is the cardinal object of the invention to provide a casting bait wherein a head member and a tail member are interconnected with a series of disk members and interposed bearing members by flexible strand members whereby when the bait is drawn through the water, in the act of fishing, the lure will partake of motions simulating that of a live minnow.

More specifically, it is an object of the invention to provide an artificial casting bait which comprises a head member and a tail member having a plurality of oval shaped plastic disks of graduated diameters which reduce in the direction of the tail portion, there being a hollow cylindrical plastic tube interposed between opposed pairs of disks forming bearing surfaces between the disks, the disks and tubes being held in assembled relation by means of a strand of stainless steel wire threaded through upper and lower aligned apertures formed in the disks and tubes, said strand being also secured to the tail portion, the latter mounting a hook concealed within a slot formed in the tail portion.

Additional objects, advantages and features of invention will be apparent from the following description, considered in conjunction with the accompanying drawing, wherein—

FIGURE 1 is a perspective view of the bait constructed in accordance with the invention.

FIGURE 2 is a longitudinal section taken on the line 2—2 of FIGURE 1.

FIGURE 3 is a section taken on the line 3—3 of FIGURE 2, and

FIGURE 4 is a cross section taken on the line 4—4 of FIGURE 2.

In FIGURES 1 and 2 of the drawings, a casting bait, generally indicated by the reference character 10 is shown, which comprises a head member 11, a tail portion 12 and a plurality of disks 13 and interposed hollow tubes 14, flexibly interconnected between the head and tail portions, as will now be described, attention being particularly invited to FIGURE 2 of the drawing.

Obviously, the bait may be constructed in various sizes and shapes and from various materials, but in the present instances, the head, disks, tubes and tail member are formed from plastic materials, in various colors or variations thereof. As here shown, the head 11 is of general ovate form in cross section, and the disks 13 are of corresponding shape, but being of reduced diameters in the direction of the tail portion 12 so as to conform to the shape of a live minnow.

As clearly shown in FIGURE 2, the head member 11 is formed with a line attaching eye 15 which is an integral part of a shank 16 which is embedded in the head member, the shank also comprising an inner eyelet 17. The head member further includes a bore 18 which extends at right angles to the eyelet 17 which bore terminates in respective lower and upper horizontal bores 19 and 20 through which and the eyelet 17, a stainless steel wire 21 is threaded, the wire also flexibly mounting the disks 13 and hollow tubes 14, as will now be described.

As previously stated, the disks and tubes are of graduated diameters and lengths, reducing in the direction of the tail portion 12, and preferably a tube 14 will be in abutting relation with the head portion and the tail portion, the tubes and disks being alternately assembled upon the wire by threading the wire through aligned openings 22 formed through the disks and tubes. The wire 21 is also threaded through openings 23 provided in the base member 24 of the tail portion, which wire also passes through a helix 25 of a dual hook, as will be presently described. The terminal ends of the wire are twisted together and soldered and housed in a depression 26 formed in the outer surface of the base 24 of the tail portion. The secured ends of the wire 21 may be concealed within the recess by an application of plastic solder 27, thus providing a smooth continuous surface.

The tail member 12 is formed by the use of a pair of thin plastic side walls 28 which have a contour similar to that of a natural fish tail, the outer upper and lower ends 29 of which are cemented or otherwise secured together. There is thus provided a vertically disposed passage 30 for housing suitable hooks 31 which are integral with respective terminal helices of the helix 25. It will also be noted that the passage 30 is in communication with an opening 32 formed in the tail 12.

In use of the bait, a fishing line (not shown) will be attached to the eyelet 15 of the shank 16, which it will be noted is positioned horizontally of the head member 11, but at a level below the medial horizontal axis of the bait. Thus, a pull upon the line will tend to produce a diving action to the bait, and under such action of the bait, water will be caused to pass upwardly or downwardly through the tubes 14, causing a turbulence of water in and about the bait, which in addition to the wiggling or wobbling action between the disks and tubes, due to the articulated assembly, will simulate the motion of a real fish attempting to escape capture. Also, due to the passage of water through passage 30 of the tail from top to bottom thereof, as well as through the rear opening 32 of the tail, a shimmering motion will be imparted to the side portions 28 of the tail of the bait.

While I have shown and described a preferred form of the invention, this is by way of illustration only, and I consider as my own all such modifications in construction as fairly fall within the scope of the appended claims.

I claim:

1. An articulated artificial casting bait comprising a head portion and a tail portion, a flexible stainless steel wire strand threaded through upper and lower openings formed in said head and tail portions to provide vertically spaced upper and lower strand portions, a plurality of oval disks threaded upon respective upper and lower strand portions, a vertically disposed cylindrical open-ended tube disposed between each pair of opposed disks, each tube having an upper and lower transverse opening for receiving the upper and lower strand portions and said tail portion having means for securement of a fish hook therein.

2. The structure of claim 1, in which the disks and tubes are of decreasing diameter and length in the direction of the tail portion.

References Cited in the file of this patent

UNITED STATES PATENTS

| | | |
|---|---|---|
| 1,109,439 | Maus | Sept. 1, 1914 |
| 1,607,107 | Weller | Nov. 16, 1926 |
| 2,261,068 | Mackovich | Oct. 28, 1941 |
| 2,481,789 | Smith | Sept. 13, 1949 |
| 2,971,285 | Murawski | Feb. 14, 1961 |

FOREIGN PATENTS

| | | |
|---|---|---|
| 1,021,228 | France | Nov. 26, 1952 |